(12) United States Patent
Kaneda et al.

(10) Patent No.: US 7,469,281 B2
(45) Date of Patent: Dec. 23, 2008

(54) NETWORK TOPOLOGY MANAGEMENT SYSTEM, MANAGEMENT APPARATUS, MANAGEMENT METHOD, MANAGEMENT PROGRAM, AND STORAGE MEDIA THAT RECORDS MANAGEMENT PROGRAM

(75) Inventors: Yasunori Kaneda, Sagamihara (JP); Tohru Nojiri, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 682 days.

(21) Appl. No.: 10/300,550

(22) Filed: Nov. 20, 2002

(65) Prior Publication Data

US 2003/0212781 A1    Nov. 13, 2003

(30) Foreign Application Priority Data

May 8, 2002 (JP) .............................. 2002-132264

(51) Int. Cl.
G06F 15/173 (2006.01)
G06F 15/16 (2006.01)

(52) U.S. Cl. .................. 709/223; 709/224; 709/247

(58) Field of Classification Search ......... 709/223–229, 709/232–237, 247
See application file for complete search history.

(56) References Cited

U.S. PATENT DOCUMENTS

| | | | |
|---|---|---|---|
| 6,209,023 B1 * | 3/2001 | Dimitroff et al. ............. | 709/211 |
| 6,671,776 B1 * | 12/2003 | DeKoning ................... | 711/114 |
| 6,683,883 B1 * | 1/2004 | Czeiger et al. .............. | 370/401 |
| 6,877,042 B2 * | 4/2005 | Tawil et al. ................. | 709/223 |
| 6,877,044 B2 * | 4/2005 | Lo et al. ........................ | 710/2 |
| 6,934,799 B2 * | 8/2005 | Acharya et al. ............. | 711/112 |

(Continued)

FOREIGN PATENT DOCUMENTS

JP    09093265 A    4/1997

(Continued)

OTHER PUBLICATIONS

Sung Kee Noh; Seok Ho Lee; "An implementation of gateway system for heterogeneous protocols over ATM" Communications, Computers and Signal Processing, 1997. '10 Years PACRIM 1987-1997—Networking the Pacific Rim'. 1997 IEEE Pacific Rim Conference on vol. 2, Aug. 20-22, 1997 pp. 535-538 vol. 2.*

(Continued)

*Primary Examiner*—Bunjob Jaroenchonwanit
*Assistant Examiner*—Angela Widhalm
(74) *Attorney, Agent, or Firm*—Hogan & Hartson LLP

(57) ABSTRACT

A network topology management system includes information processing units, storage units, connection units that control connection switching between the information processing units and the storage units, a management unit that manages a network topology consisting of the information processing units, the storage units and the connection units, and an emulator connected to the connection units and to the management unit of the network. The emulator comprises a conversion section that converts first equipment identification information that identifies the information processing units or the storage units into second equipment identification information that is recognizable by the management unit to identify the information processing units or the storage units, and a transmitting section that sends the second equipment identification information to the management unit. The management device has a control section that manages the network topology based on the second equipment identification information.

4 Claims, 15 Drawing Sheets

U.S. PATENT DOCUMENTS

| | | | |
|---|---|---|---|
| 6,981,036 B1 * | 12/2005 | Hamada | 709/223 |
| 6,996,670 B2 * | 2/2006 | Delaire et al. | 711/114 |
| 7,068,666 B2 * | 6/2006 | Foster et al. | 370/397 |
| 7,085,827 B2 * | 8/2006 | Ishizaki et al. | 709/223 |
| 7,171,453 B2 * | 1/2007 | Iwami | 709/218 |
| 7,197,047 B2 * | 3/2007 | Latif et al. | 370/466 |
| 7,200,144 B2 * | 4/2007 | Terrell et al. | 370/389 |
| 2002/0114328 A1 * | 8/2002 | Miyamoto et al. | 370/389 |
| 2002/0156612 A1 * | 10/2002 | Schulter et al. | 703/23 |
| 2003/0088683 A1 * | 5/2003 | Kitamura et al. | 709/230 |
| 2003/0202520 A1 * | 10/2003 | Witkowski et al. | 370/400 |
| 2003/0204580 A1 * | 10/2003 | Baldwin et al. | 709/223 |
| 2004/0010612 A1 * | 1/2004 | Pandya | 709/230 |
| 2004/0073677 A1 | 4/2004 | Honma et al. | |
| 2005/0050191 A1 * | 3/2005 | Hubis | 709/223 |

FOREIGN PATENT DOCUMENTS

| | | |
|---|---|---|
| JP | 2000183871 A | 6/2000 |
| JP | 2002007304 A | 1/2002 |

OTHER PUBLICATIONS

Notare et al. "Formal design of a telecommunications networks management system" Computers and Communications, 1997. Proceedings., Second IEEE Symposium on Jul. 1-3, 1997 pp. 146-150.*

Liu Zhi-guo; Wang Guang-xing; "An approach to distributed heterogeneous network management of mobile agent architecture based" Info-tech and Info-net, 2001. Proceedings. ICII 2001—Beijing. 2001 International Conferences on vol. 2, Oct. 29-Nov. 1, 2001 pp. 228-233 vol. 2.*

Shyne, S.; Markle, H.; "Managing heterogeneous networks across security/coalition domains" MILCOM 2000, 21st Century Military Communications Conference Proceedings vol. 1, Oct. 22-25, 2000 pp. 430-434 vol. 1.*

English translation of Japanese office action for corresponding Japanese patent application No. 2002132264 lists.

* cited by examiner

| FC Port No. | FC Port WWN | Connection Destination WWN |
|---|---|---|
| 1 | 151 | 101 |
| 2 | 152 | 102 |
| 3 | 153 | 103 |
| 4 | 154 | 104 |

Fig. 4

| Equipment Name | Classification | WWN |
|---|---|---|
| Computer A | Computer | 101 |

⌐ 121

| Equipment Name | Classification | WWN |
|---|---|---|
| Computer B | Computer | 102 |

⌐ 122

| Equipment Name | Classification | WWN |
|---|---|---|
| Computer C | Computer | 401 |

⌐ 123

| Equipment Name | Classification | WWN |
|---|---|---|
| Computer D | Computer | 402 |

⌐ 124

| Equipment Name | Classification | WWN |
|---|---|---|
| Storage A | Storage Device | 103 |

⌐ 125

| Equipment Name | Classification | WWN |
|---|---|---|
| Storage B | Storage Device | 104 |

⌐ 126

| Equipment Name | Classification | WWN |
|---|---|---|
| Storage C | Storage Device | 403 |

⌐ 127

| Equipment Name | Classification | WWN |
|---|---|---|
| Storage D | Storage Device | 404 |

| IP Switch No. | IP Port No. | Virtual WWN |
|---|---|---|
| 250 | 1 | 451 |
| 250 | 2 | 452 |
| 250 | 3 | 453 |
| 250 | 4 | 454 |
| : | : | : |

| Virtual WWN | Actual MAC Address |
|---|---|
| 401 | 201 |
| 402 | 202 |
| 403 | 203 |
| 404 | 204 |
| : | : |

| Zone Name | WWN Composing Zone |
|---|---|
| Zone C | 401 |
| | 451 |
| | 453 |
| | 403 |
| Zone D | 402 |
| | 452 |
| | 454 |
| | 404 |

| VLAN Name | IP Port No. Composing VLAN |
|---|---|
| VLAN1 | 1 |
| | 3 |
| VLAN2 | 2 |
| | 4 |

| FC Port No. | FC Port WWN | Connection Destination WWN | Virtual MAC Address | IP Address |
|---|---|---|---|---|
| 1 | 151 | 101 | 501 | 601 |
| 2 | 152 | 102 | 502 | 602 |
| 3 | 153 | 103 | 503 | 603 |
| 4 | 154 | 104 | 504 | 604 |

Fig. 17

| Equipment Name | Classfication | WWN |
|---|---|---|
| Computer A | Computer | 601 |

⌐ 221

| Equipment Name | Classification | WWN |
|---|---|---|
| Computer B | Computer | 602 |

⌐ 222

| Equipment Name | Classification | WWN |
|---|---|---|
| Computer C | Computer | 605 |

⌐ 223

| Equipment Name | Classification | WWN |
|---|---|---|
| Computer D | Computer | 606 |

⌐ 224

| Equipment Name | Classification | WWN |
|---|---|---|
| Storage A | Storage Device | 603 |

⌐ 225

| Equipment Name | Classification | WWN |
|---|---|---|
| Storage B | Storage Device | 604 |

⌐ 226

| Equipment Name | Classification | WWN |
|---|---|---|
| Storage C | Storage Device | 607 |

⌐ 227

| Equipment Name | Classification | WWN |
|---|---|---|
| Storage D | Storage Device | 608 |

⌐ 228

NETWORK TOPOLOGY MANAGEMENT SYSTEM, MANAGEMENT APPARATUS, MANAGEMENT METHOD, MANAGEMENT PROGRAM, AND STORAGE MEDIA THAT RECORDS MANAGEMENT PROGRAM

FIELD OF THE INVENTION

The present invention relates to a management method for storage units (storages) in information processing systems, and more particularly to providing a consolidated management method for equipments managed under different information equipment identification numbers (e.g., WWNs and MAC addresses) when a plurality of connection devices such as Fibre Channel and Ethernet (Ethernet is a registered trademark of Fuji Xerox Co., Ltd. This remark applies to all subsequent references to Ethernet.) is used to create storage units.

DESCRIPTION OF THE RELATED ART

Information processing units (computers) and storage units (storages) in conventional information processing systems were connected by ATAPI (ATA packet interface) or SCSI (small computer system interface). Under the ATAPI, only two storages, a master device and a slave device, could be connected to one cable due to its specification. Also, due to its short connection distance, it has been used generally to connect storages (primarily hard disks and CD-ROM drives) within a computer. SCSI comes in several different specifications, but with a SCSI that uses an 8-bit data bus width, a maximum of eight devices can be connected in a daisy chain. SCSI has been used as a key interface in computer systems to connect with external storage. However, due to limitations in the maximum configuration that is determined by the connection distance and/or electrical properties, large-scale storage systems have been difficult to construct.

In recent years, SAN (storage area network) has become widely known as a storage network constructed by using fibre channels. In the SAN, more complex, wide area systems can be constructed, since systems that use switches, hubs and routers can be constructed, in contrast to systems that use ATAPI or SCSI.

FIG. 19 is an example of a configuration of SAN. In FIG. 19, four computers 100 and four storages 110 are connected via two fibre channel switches 150. The network topology of such an SAN requires management. By operating topology management software on a topology management console, a display section of the topology management console would show information display data 3009, which is information on the connection status and failures in a storage network, such as shown in FIG. 20. Consequently, topology management consoles can consolidate the topology management of SANs such as the one shown in FIG. 19.

In the meantime, IP-SAN, which realizes on an IP network a fibre channel that connects a server and storages, has been introduced in recent years as part of trend in storage network. In IP-SAN, Ethernet can be used.

Whereas identification numbers called WWNs (world wide names) are used to identify equipments in fibre channels, identification numbers called MAC (media access control) addresses or IP addresses are used to identify equipments in the Ethernet.

With the introduction of the IP-SAN, a new topology management system to manage information processing systems that include the Ethernet becomes necessary. Using equipment identification numbers that administrators are not familiar with creates a great operational burden on the administrators. Especially in storage networks that include both the fibre channel and the Ethernet, administrators would have to manage the topology based on two information equipment identification number systems, e.g., one for the fibre channel and the other for Ethernet, which creates an excessive operational burden on the administrators.

SUMMARY OF THE INVENTION

In view of the above, the present invention provides a topology management system that does not require any development of new topology management consoles (or of topology management software designed for MAC addresses), even when a storage network with new equipment identification numbers is connected.

The present invention also provides a topology management system that allows a consolidated topology management using equipment identification numbers topology administrators are familiar with. Particularly in storage networks connected by Ethernet, the present invention provides a topology management system that allows topology management consoles to have a consolidated topology management with WWNs and without having to work with MAC addresses or IP addresses.

Furthermore, the present invention provides, in storage networks in which two or more networks having different information equipment identification number systems such as fibre channel and Ethernet coexist, a system that allows topology management consoles to operate and manage, in a consolidated manner and by using WWN, equipments that make up the network.

In accordance with an embodiment of the present invention, a network topology management system includes information processing units; storage units; connection units that control connection switching between the information processing units and the storage units; a management unit that manages a network topology consisting of the information processing units, the storage units and the connection units; and an emulator connected to the connection units and to the management unit. The emulator has a conversion section that converts first equipment identification information that identifies the information processing units or the storage units into second equipment identification information that identifies the information processing units or the storage units in a manner recognizable by the management unit, and a transmitting section that sends the second equipment identification information to the management unit. The management device has a control section that manages the network topology based on the second equipment identification information.

In a management system in accordance with one embodiment of the present invention, it is desirable that one of the first equipment identification information and the second equipment identification information is information that includes WWNs, while the other is information that includes MAC addresses.

Further in a management system in accordance with one embodiment of the present invention, the management unit may preferably have a providing section that provides the result of a correlation made by the control section between the network topology and the second equipment identification information.

In a management system in accordance with one embodiment of the present invention, the transmitting section of the emulator may preferably send to the management unit the first equipment identification information corresponding to each equipment identification information, and the management unit may preferably have a providing section that provides the result of a correlation made by the control section among the network topology, the first equipment identification information and the second equipment identification information.

In a management system in accordance with one embodiment of the present invention, the emulator may preferably have an allocation section that allocates the second equipment identification information, which is converted by the conversion section, such that it would be unique within the network.

Moreover, a network topology management system in accordance with one embodiment of the present invention includes information processing units; storage units; connection units that control connection switching between the information processing units and the storage units; and a management unit that manages a network topology consisting of the information processing units, the storage units and the connection units. Each of the information processing units and the storage units has a transmitting section that sends its IP address, obtained from a DHCP server, to the management unit. The management unit has a control section that outputs to a providing section a topology map that correlates, based on the IP addresses, the positions in the network of the information processing units, storage units and the connection units to the IP addresses of the information processing units, the storage units and the connection units. By doing this, an IP-SAN's topology can be managed using the IP addresses, which makes the connection of communication paths easy and controls equipment investment by utilizing the existing IP assets and connecting IP equipments. IP addresses also can be MAC addresses of each of the information processing units, storage units and connection units. By doing this, the topology of a storage network connected by an exclusive line and not on an IP network can be managed.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 4 shows a table indicating equipment identification information in accordance with the first embodiment.

FIGS. 7(A) and 7(B) show conversion tables in accordance with the first embodiment.

FIG. 10 shows a table indicating zoning setting requests to a virtual-FC switch.

FIG. 11 shows a table indicating VLAN setting requests to an IP switch.

FIG. 17 shows a table indicating equipment identification information in accordance with the second embodiment.

DESCRIPTION OF PREFERRED EMBODIMENTS

The embodiments of the present invention are described below with reference to the accompanying drawings.

First Embodiment

Figure 1:
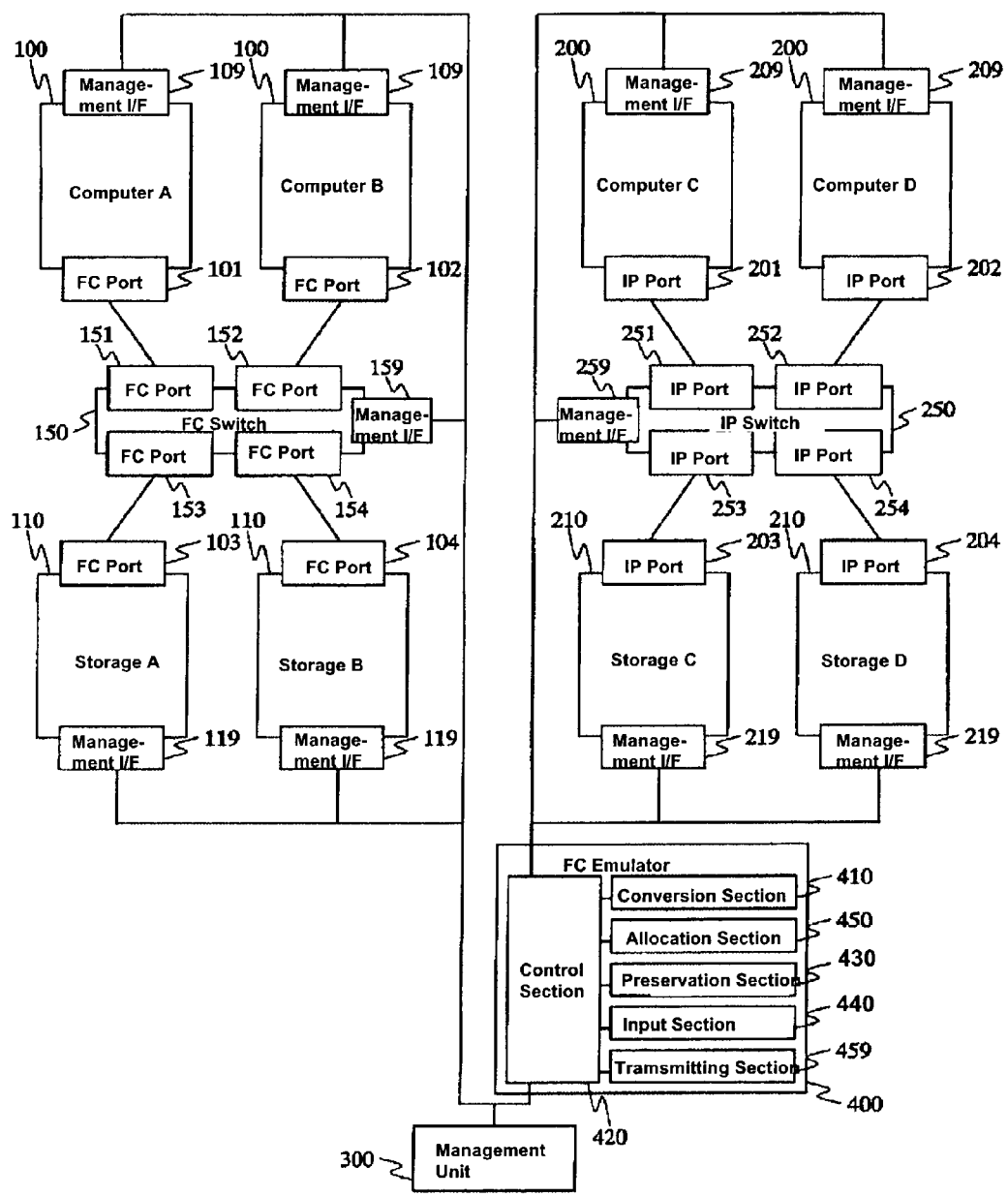
FIG. 1 shows a block diagram of a system in accordance with a first embodiment of the present invention.

FIG. 1 shows a system configuration of the first embodiment. In the system configuration in FIG. 1, a system is constructed by using two types of connection units, an FC (fibre channel) switch 150 and an IP switch 250. Two computers 100 and two storages 110 are connected via the FC switch 150. Each of the computers 100 has an FC port 101 or 102, and the FC ports 101 and 102 are connected to ports 151 and 152, respectively, of the FC switch 150. Each of the two storages 110 has an FC port 103 or 104, and the FC ports 103 and 104 are connected to ports 153 and 154, respectively, of the FC switch 150. Two computers 200 and two storages 210 are connected via the IP switch 250. Each of the computers 200 has an IP port 201 or 202, and the IP ports 201 and 202 are connected to ports 251 and 252, respectively, of the IP switch 250. Each of the storages 210 has an IP port 203 or 204, and the IP ports 203 and 204 are connected to ports 253 and 254, respectively, of the IP switch 250.

Each of the computers 100 has a management interface 109, each of the storages 110 has a management interface 119, and the FC switch 150 has a management interface 159. Each of the computers 200 has a management interface 209, each of the storages 210 has a management interface 219, and the IP switch 250 has a management interface 259.

An FC emulator 400 has an allocation section 450 that allocates a virtual WWN to each of the IP ports of the IP switch 250 and allocates a virtual WWN to each MAC address that identifies each of the computers 200 (C,D) and storages 210 (C,D); a preservation section 430 that preserves a range of WWNs that can be allocated to allocate an identification number unique to each equipment; a conversion section 410 that converts MAC addresses into virtual WWNs recognizable by a management unit 300; and a transmitting section 459 that sends to the management unit 300 the converted WWNs and MAC addresses that correspond to the various WWNs.

A program that allows the allocation section 450, the conversion section 410 and the transmitting section 459 to function is recorded on a recording medium such as CD-ROM, and once the program is stored on a magnetic disk, it is loaded on memory and executed. The medium on which to record the program can be a CD-ROM or any other recording media. The program can also be installed from the recording medium to the FC emulator 400, or the program can be used by accessing the recording medium through a network.

Each of the computers 100 is connected to the management unit 300 via the management interface 109. Each of the storages 110 is connected to the management unit 300 via the management interface 119. The FC switch 150 is connected to the management unit 300 via the management interface 159. Each of the computers 200 is connected to the management unit 300 via the management interface 209 and the FC emulator 400. Each of the storages 210 is connected to the management unit 300 via the management interface 219 and the FC emulator 400. The IP switch 250 is connected to the management unit 300 via the management interface 259 and the FC emulator 400.

Figures 2, 3:
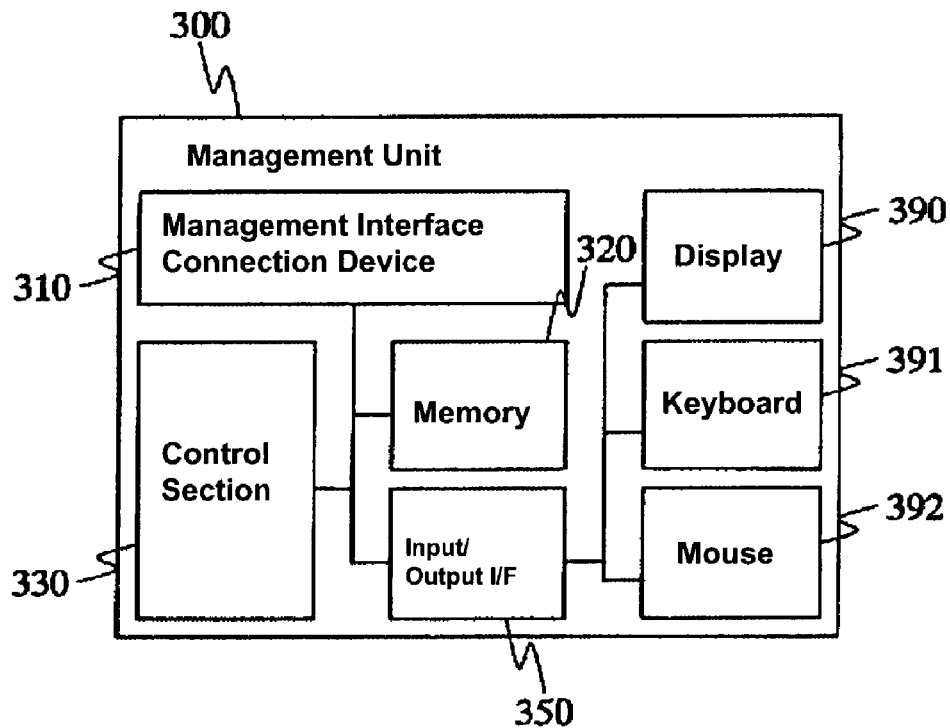
FIG. 2 shows a block diagram of a management unit.
FIG. 3 shows a table indicating connection information of an FC switch.

FIG. 2 is a block diagram of the management unit 300. The management unit 300 has a management interface connection device 310 that realizes connection with each of the management interfaces; a memory 320 that stores various information received via the management interface connection device 310, as well as data and programs executed by a control section 330; an input/output interface 350 that connects a display 390, a keyboard 391 and a mouse 392; and the control section 330 that manages the network topology by executing topology management software.

Next, we will explain the allocation section 450 and the conversion section 410 of the FC emulator 400 in accordance with an embodiment of the present invention.

First, the control section 420 of the FC emulator 400 searches for IP switches under the control of the FC emulator 400. Equipments that are connected to the FC emulator 400 respond with their respective equipment names and classifications to an inquiry from the control section 420 of the FC emulator 400. In the case of a computer, its classification is "information processing unit"; in the case of a storage, its classification is "storage unit"; and in the case of an IP switch, its classification is "IP switch." When an IP switch (the IP switch 250 in the configuration shown in FIG. 1) is found, the control section 420 of the FC emulator 400 issues to the IP switch 250 a request to obtain connection information. The IP switch 250, upon receiving the request to obtain connection information, sends connection information 255.

In the configuration shown in FIG. 1, the IP switch 250 has four IP ports, and the IP ports are numbered 1 through 4. The connection information from the IP switch 250 is expressed in terms of the IP port numbers of the IP switch and MAC addresses of the equipments connected to various IP ports. The MAC addresses are expressed in 6-byte figures in reality, but in the present embodiment the IP port numbers in FIG. 1 are used as various MAC addresses for the sake of simplification.

Figure 6:
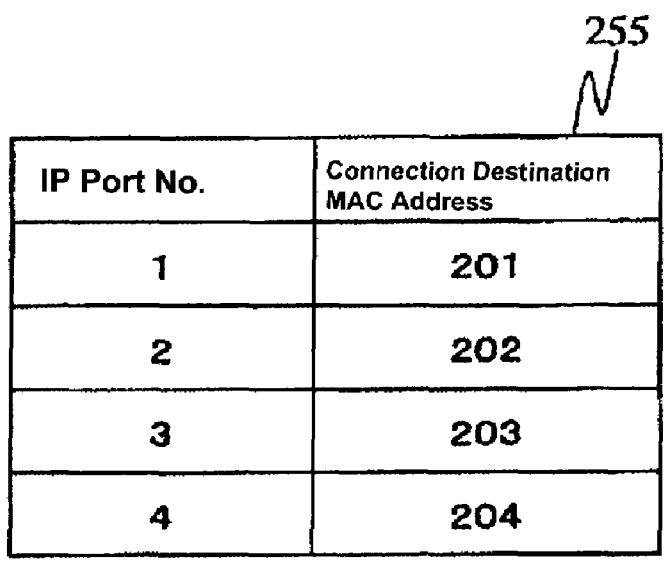
FIG. 6 shows a table indicating connection information of an IP switch.

FIG. 6 shows the connection information 255 that specifies the equipments connected to the various connection ports of the IP switch 250.

The control section 420 of the FC emulator 400 recognizes from the connection information 255 that equipments with the MAC addresses 201-204 are connected to the IP ports 1-4 of the IP switch 250, respectively. The control section 420 of the FC emulator 400 instructs the allocation section 450 to allocate a virtual WWN to each of the IP ports 1-4 and to each of the MAC addresses 201-204.

FIGS. 7(A) and 7(B) show the contents of conversion tables 408 and 409, respectively.

Here, we will assume that the allocation section 450 of the FC emulator 400 allocated virtual WWNs 451-454 to the IP ports 1-4, respectively, of the IP switch 250 and virtual WWNs 401-404 to the MAC addresses 201-204, respectively, to create the conversion tables 408 and 409 as shown in FIG. 7, and stored them in the conversion section 410.

WWNs are expressed in 8-byte figures in reality, but values indicated above are used in the present embodiment for the sake of simplification.

WWNs must be unique to each FC port. Consequently, usable WWNs are allocated in advance to the FC emulator 400, and the allocation section 450 allocates virtual WWNs only from the range of WWNs allocated. The FC emulator 400 is provided with a preservation section 430 that preserves the range of WWNs. The allocation section 450 allocates virtual WWNs only from the range determined by the preservation section 430. If the allocated WWNs run out, no further WWNs can be allocated.

The range of WWNs that are preserved in the preservation section 430 can be input in advance of shipping the FC emulator, or it can be made variable by using an input section 440. When using the input section 440, due to the fact that the uniqueness of each WWN may be lost when the WWN itself is input, it is desirable to design for example the program so that several WWNs that were allocated in advance would be released when a release key is input.

Next, we will describe topology management. Topology management refers to the management of the physical topology between one equipment and another, as shown in FIG. 1, as well as of the operational status and failure information of the equipments themselves. In the present embodiment, the control section 330 of the management unit 300 governs the topology management. For this reason, the management unit 300 runs topology management software (omitted from drawings) for the WWNs. The control section 330 of the management unit 300, in order to display the current topology of equipments on the display 390, collects connection information from the FC switch 150 and the IP switch 250 (as described later, this information from the IP switch 250 is obtained via the FC emulator 400 in the present embodiment) via the management interface connection device 310 and stores the information in the memory 320. The connection information stored in the memory 320 is used to display the topology of the equipments on the display 390.

Next, we will describe the procedure by which the management unit 300 displays the topology (e.g., connection status) on the display 390.

In the configuration shown in FIG. 1, although there are switches with two different information equipment identification number systems, e.g., the FC switch 150 and the IP switch 250, to the control section 330 of the management unit 300 it looks, via the management interface connection device 310, as though two FC switches are connected, due to the fact that the FC emulator 400 is provided.

First, the control section 330 of the management unit 300 searches via the management interface connection device 310 for FC switches that are connected. Each of the equipments connected to the management unit 300 responds with its equipment name and classification to an inquiry from the management unit 300. In the case of a computer, its classification is "information processing unit"; in the case of a storage, its classification is "storage unit"; and in the case of an FC switch, its classification is "FC switch." The inquiry from the management unit 300 to the IP switch 250 is intercepted by the control section 420 of the FC emulator 400, which converts the inquiry into one for IP switches and issues the converted inquiry to the IP switch 250. The IP switch 250 responds with its equipment name and classification, and naturally its classification is "IP switch." The control section 420 of the FC emulator 400 then converts the classification to "FC switch" and responds as such to the management unit 300. Based on this, the management unit 300 detects two FC switches in the case of the embodiment in FIG. 1. Here, the IP switch 250 that is made to appear virtually as a FC switch by the FC emulator 400 is called a "virtual-FC switch" to distinguish it from true FC switches. The control section 330 of the management unit 300 issues to the two FC switches detected (one of which is a virtual-FC switch) a request to obtain connection information. The control section 330 of the management unit 300 issues, via the management interface connection device 310, a request to obtain connection information to the FC switch 150. The FC switch 150, upon receiving the request to obtain connection information from the management unit 300, sends connection information 155.

FIG. 3 indicates the connection information 155 of the FC switch 150. The connection information of the FC switch 150 is expressed using the WWNs. WWNs are expressed in 8-byte figures in reality, but the FC port numbers indicated in FIG. 1 are used as WWNs to simplify the explanation in the present embodiment.

As FIG. 3 shows, the connection information 155 indicates that equipments with WWNs 101-104 are connected to the WWNs 151-154, respectively, of the FC switch 150.

The control section 330 of the management unit 300 issues to the virtual-FC switch (IP switch 250), via the management interface connection device 310, a request to obtain connection information. The control section 330 of the management unit 300 is made to recognize the IP switch 250 as a virtual-FC switch by the FC emulator 400 (due to the fact that the FC emulator 400 causes the classification of the IP switch 250 to be managed as an "FC switch"). The request to obtain connection information issued to the virtual-FC switch is intercepted by the control section 420 of the FC emulator 400, which then issues the request to the IP switch 250. Upon receiving the request to obtain connection information, the IP switch 250 sends the connection information 255, such as shown in FIG. 6. The connection information from the IP switch 250 is expressed in terms of the port numbers of the IP switch and the MAC addresses of the equipments connected to various MAC addresses.

MAC addresses are expressed in 6-byte figures in reality, but the IP port numbers indicated in FIG. 1 are used as MAC addresses to simplify the explanation in the present embodiment.

The control section 420 of the FC emulator 400 recognizes from the connection information 255 that the MAC addresses 201-204 are connected to the IP ports 1-4 of the IP switch 250, respectively. The control section 420 of the FC emulator 400, upon receiving the connection information 255 from the IP switch 250, creates connection information 256 using the conversion tables 408 and 409 shown in FIG. 7 of the conversion section 410, and sends the connection information 256 to the management unit 300.

Figure 8:
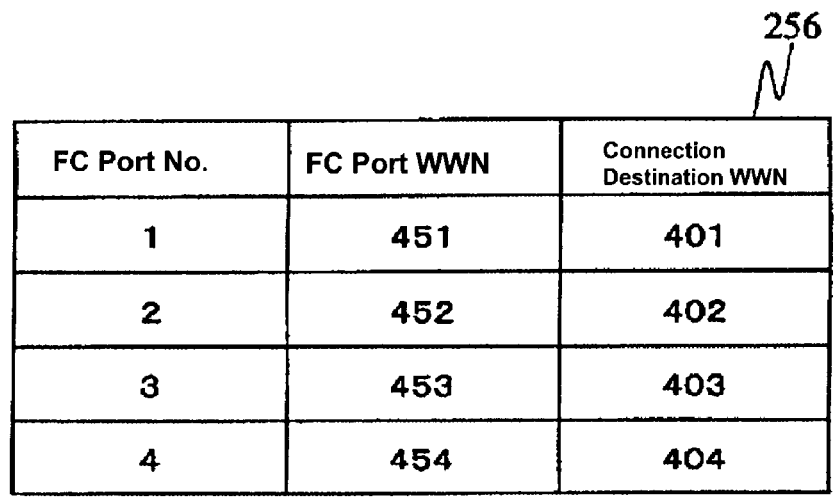
FIG. 8 shows a table indicating the connection information converted by an FC emulator in accordance with the first embodiment.

FIG. 8 indicates the connection information 256 converted by the FC emulator 400.

The control section 330 of the management unit 300 recognizes from the connection information 256 shown in FIG. 8 that equipments with the virtual WWNs 401-404 are connected to virtual WWNs 451-454, respectively, of the virtual-FC switch.

As stated above, the control section 330 of the management unit 300 can obtain the connection information 155 from the FC switch 150, and the connection information 256 from the IP switch 250 via the FC emulator 400. Although the connection information reveals the WWNs of the equipments connected in each case, it does not reveal the names or classifications of the equipments connected. For this reason, the control section 330 of the management unit 300 via the management interface connection device 310 makes an inquiry to each of the computers 100 and 200, as well as to each of the storages 110 and 210, in an attempt to obtain the name, classification and WWN of each equipment. Equipment identification information can be obtained directly from each of the computers 100 and the storages 110, since these are connected directly with the management unit 300.

FIG. 4 indicates the equipment identification information. In response to the inquiry from the control section 330 of the management unit 300, each of the computers 100 sends equipment identification information 121 or 122, while each of the storages 110 sends equipment identification information 125 or 126.

Since the computers 200 and the storages 210 are connected to the management unit 300 via the FC emulator 400, the request to obtain equipment identification information from the management unit 300 is issued to each of the computers 200 and storages 210 after the request is converted by the control section 420 of the FC emulator 400. Each of the computers 200 and the storages 210 sends its equipment name, classification and the MAC address as equipment identification information to the FC emulator 400. The control section 420 of the FC emulator 400 converts the MAC address in each equipment identification information into the corresponding virtual WWN based on the conversion table 409 and sends the converted equipment identification information to the management unit 300. The management unit 300 receives equipment identification information 123 and 124 as the equipment identification information from the computers 200 and equipment identification information 127 and 128 as the equipment identification information from the storages 210. The equipment identification information 123 and 124, as well as 127 and 128, include virtual WWNs converted by the FC emulator 400.

Figure 5:
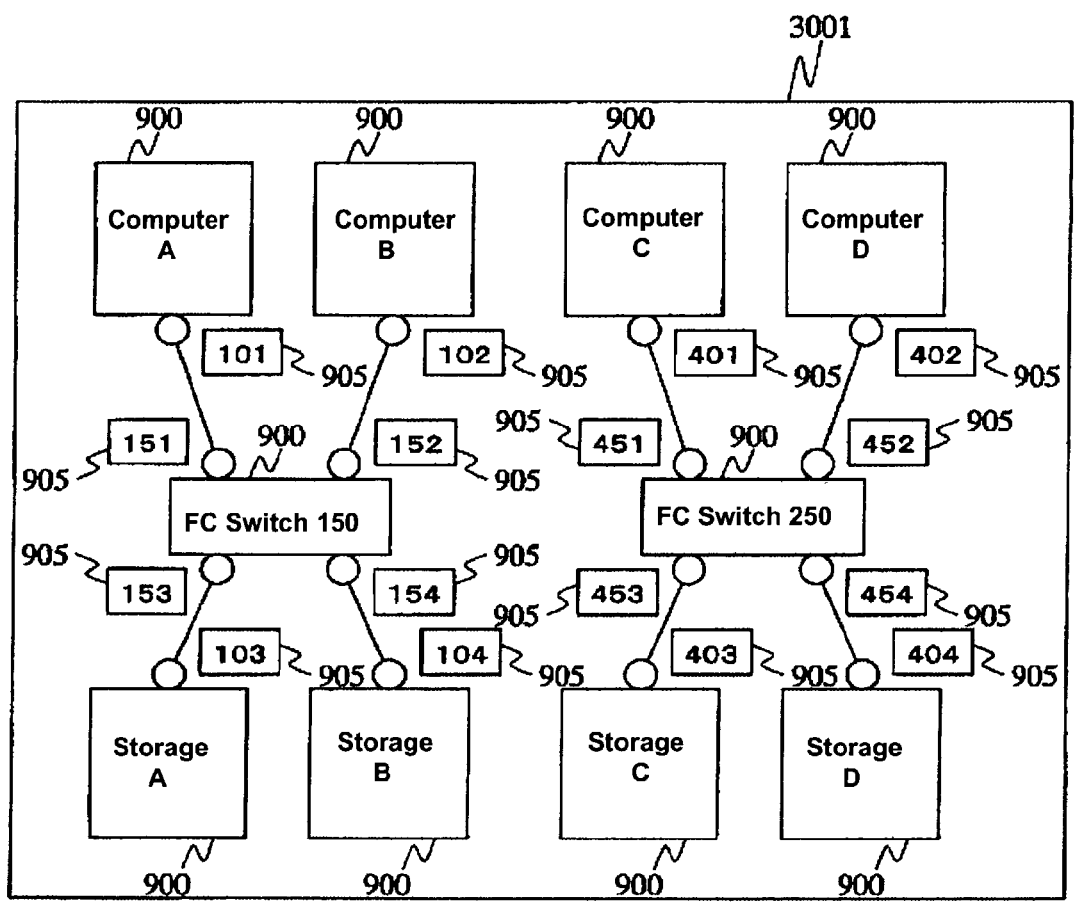
FIG. 5 shows a diagram indicating display data of the management unit in accordance with the first embodiment.

FIG. 5 shows display data 3001 of the management unit 300.

Based on the connection information 155 and 256 and equipment identification information 121-128, the control section 330 of the management unit 300 generates the display data 3001, in which the topology of the network and the equipment identification information are correlated, and outputs the display data 3001 to the display 390. In the display data 3001 shown in FIG. 5, each rectangular region 900 represents one equipment; in reality, each rectangular region 900 can be replaced by an icon (a small image represented by bit map) representing that equipment. Small circles represent FC ports, and a WWN display region 905 is provided near each small circle to display the WWN of the corresponding FC port.

Next, we will describe the processing that takes place in the management unit 300 in the event one of the equipments comprising FIG. 1 fails.

In the following explanation, we will use as an example a situation in which a cooling fan (omitted from drawings) of the storage 210 fails. Upon detecting the failure of the cooling fan, the storage 210 issues to the FC emulator 400 a failure notification packet that includes the MAC address of the storage 210. When the control section 420 of the FC emulator 400 receives the failure notification packet, it converts the MAC address of the storage 210 in the failure notification packet into the corresponding virtual WWN based on the conversion table 409 of the conversion section 410 and sends the converted failure notification packet to the management unit 300. Upon receiving the failure notification packet, the control section 330 of the management unit 300 displays an X icon or an error message over the icon for the storage 210 to which the WWN corresponds, in order to indicate that its cooling fan has failed.

Figure 9:
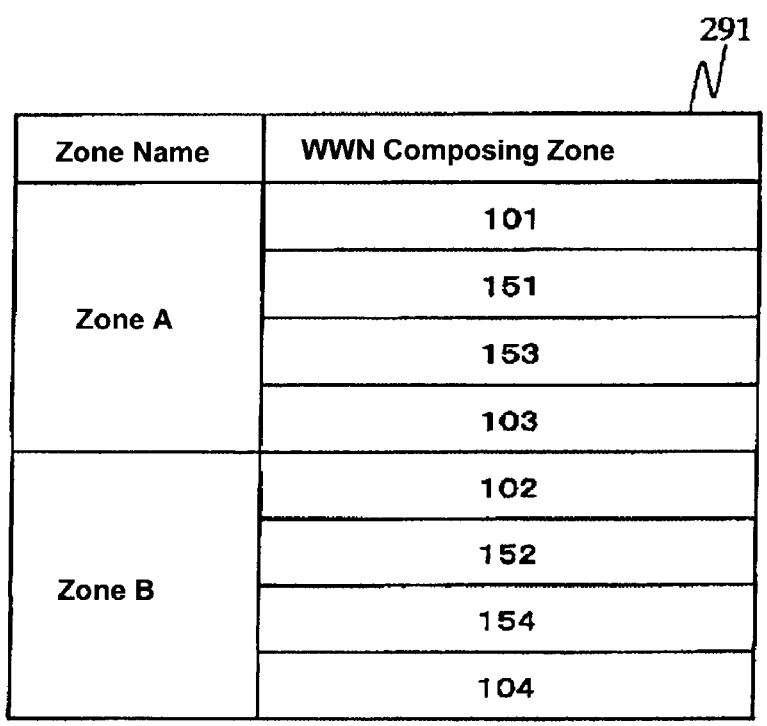
FIG. 9 shows a table indicating zoning setting requests to the FC switch.

FIG. 9 indicates a zoning setting request 291 issued to the FC switch 150. Zoning refers to a setup that allows communication only between certain equipments in an FC switch. In the system configuration shown in FIG. 1, this can be a setting that makes the storage A available for use only by the computer A and the storage B available for use only by the computer B, for example. The control section 330 of the management unit 300 issues the zoning setting request 291 to the FC switch 150 via the management interface connection device 310. Upon receiving the zoning setting request 291, the FC switch 150 permits communication only among WWNs 101, 103, 151 and 153 in zone A, and only among WWNs 102, 104, 152 and 154 in zone B. As a result of this, the computer B cannot use the storage A, and the computer A cannot use the storage B.

FIG. 10 indicates a zoning setting request 292 issued to the virtual-FC switch. In order to similarly obtain a setting whereby the storage C is available for use only by the computer C and the storage D is available for use only by the computer D, the control section 330 of the management unit 300 issues the zoning setting request 292 to the virtual-FC switch via the management interface connection device 310.

FIG. 11 indicates a VLAN (virtual LAN) setting request 293 issued to the IP switch 250. First, the management unit 300 issues the zoning setting request 292 to the FC emulator 400. Based on the zoning setting request 292, the control section 420 of the FC emulator 400 creates the VLAN setting request 293 using the conversion tables 408 and 409 of the conversion section 410, and issues the VLAN setting request 293 to the IP switch 250. Upon receiving the VLAN setting request 293, the IP switch 250 controls connection relations so that communication only between IP ports 1 and 3 is permitted in VLAN 1 and communication only between IP ports 2 and 4 is permitted in VLAN 2. As a result of this, the computer D cannot use the storage C, and the computer C cannot use the storage D.

As stated earlier, although the zoning and VLAN of the FC switch 150 and the IP switch 250, respectively, establish different setups based on different setting requests, i.e., the zoning setting request and the VLAN setting request, they both realize communication only between certain computers and certain storages. Since the zoning setting request from the management unit 300 to the virtual-FC switch is converted into a VLAN setting request by the FC emulator 400 before it is issued to the IP switch 250, the administrator who uses the management unit 300 can perform the VLAN setting for the IP switch using the same method that he or she uses to perform the zoning setting for the FC switch and without having to be aware that it is in fact an IP switch.

As stated earlier, by providing the FC emulator 400, the management unit 300 can consolidate its management of the system including the IP switch 250 through the use of WWNs. There is no need to add to the management unit 300 any topology management software designed to accommodate MAC addresses, and topology management software designed only to accommodate conventional WWNs can be used.

However, in order to specify equipments in the real world, it is sometimes desirable to display the MAC addresses of the equipments and not only their virtual WWNs on the display 390 of the management unit 300. In such cases, a configuration can be created that allows the management unit 300 to read the conversion tables 408 and 409 that the conversion section 410 of the FC emulator 400 has. To do this, the transmitting section 459 should be provided in the FC emulator 400.

The management unit 300 requests the transmitting section 459 of the FC emulator 400, via the management interface connection device 310, to send a conversion table that specifies a pre-conversion MAC address for each converted WWN. The management unit 300 receives the conversion table and stores it in the memory 320.

The control section 330 of the management unit 300 displays on the display 390 the virtual WWNs and their corresponding MAC addresses from the conversion table stored in the memory 320. Assuming that the display data 3001 as shown in FIG. 5 is displayed on the display 390 of the management unit 300, when the administrator uses the keyboard 391 or the mouse 392 to select a certain rectangular region 900 (the selection is made by clicking a button on the mouse 392 or by inputting with the keyboard 391), the virtual WWN of the selected rectangular region 900 and its corresponding MAC address, which has been retrieved from the conversion table stored in the memory 320, are displayed on the WWN display region 905 provided near the selected rectangular region 900. Alternatively, a function to display a list from the conversion table can be provided in the management unit 300, so that the list from the conversion table can be displayed.

In this way, the virtual WWNs and the MAC addresses can be correlated, and even when displaying a failed equipment described earlier, the failed equipment in the real world can be specified more easily by displaying its virtual WWN and MAC address.

In the present embodiment the FC emulator 400 is described as an equipment independent of the IP switch 250, but the functions of the FC emulator 400 can be provided within the IP switch 250. In this case, an IP switch 250 has an allocation section that allocates a virtual WWN to each of the IP ports of the IP switch 250 and allocates a virtual WWN to each MAC address that identifies each computer 200 (C,D) and each storage 210 (C,D); a preservation section that preserves a range of WWNs that can be allocated to allocate an identification number unique to each equipment; a conversion section that converts MAC addresses into virtual WWNs recognizable by a management unit 300; and a transmitting section that sends to the management unit 300 the converted WWNs and the MAC addresses that correspond to various WWNs.

Or, the functions of the FC emulator 400 can be provided within the management unit 300. In this case, a management unit 300 has an allocation section that allocates a virtual WWN to each of the IP ports of an IP switch 250 and allocates a virtual WWN to each MAC address that identifies each computer 200 (C,D) and each storage 210 (C,D); a preservation section that preserves a range of WWNs that can be allocated to allocate an identification number unique to each equipment; a conversion section that converts MAC addresses into virtual WWNs recognizable by the management unit 300; a control section to manage the network topology based on the converted WWNs; and a providing section that provides the result of correlation made by the control section among the network topology, converted WWNs, and the MAC addresses corresponding to various WWNs.

In another embodiment, the conversion section 410 of the FC emulator 400 may convert WWNs to MAC addresses based on conversion tables, and it may be connected between the FC switch 150 and the management unit 300. In other words, in this case, since the management unit 300 can specify equipments in the network by their MAC addresses, the management unit 300's connection with the computer C, the storage C and/or with the FC emulator can be made with an exclusive line. In this case, the IP switch 250 does not need to communicate with IP addresses, which means that a DHCP server that assigns IP addresses as described later becomes unnecessary. As a result, the topology management of storage networks whose network sizes are relatively small can be done economically.

The Second Embodiment

Figure 12:
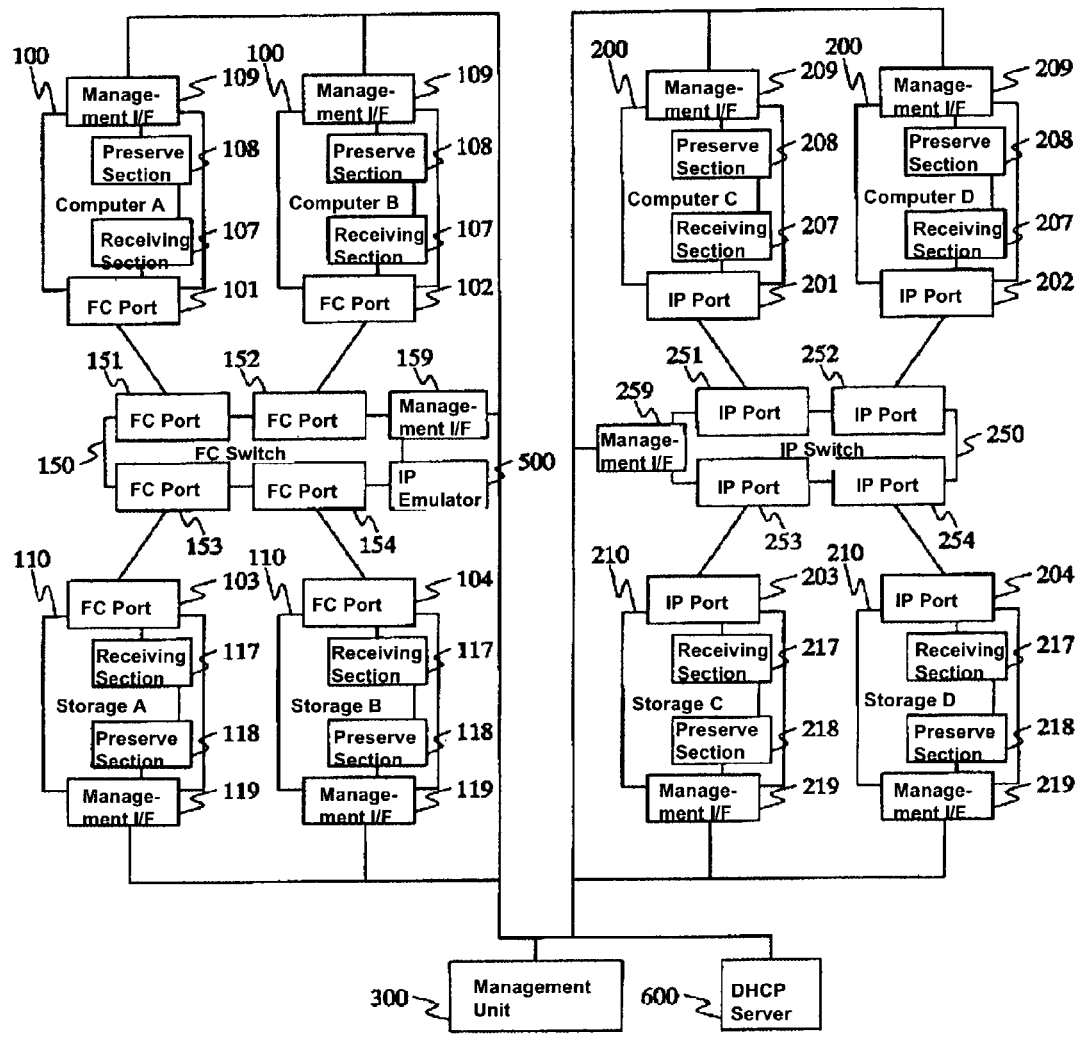
FIG. 12 shows a block diagram of a system in accordance with a second embodiment of the present invention.

FIG. 12 indicates a system configuration of the second embodiment. The difference between the first and second embodiments is that instead of the FC emulator 400 in the first embodiment, an IP emulator 500 is used in the second embodiment.

Figures 13, 14:
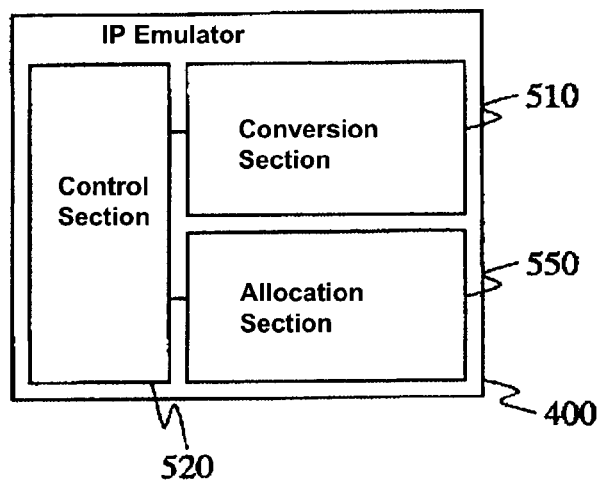
FIG. 13 shows a block diagram of an IP emulator.
FIG. 14 shows a conversion table in accordance with the second embodiment.

FIG. 13 is a block diagram of the IP emulator 500. The IP emulator 500 is provided inside an FC switch 150. Further in the second embodiment, a DHCP server 600 is provided in order to realize a management that utilizes IP addresses. The DHCP server 600 functions to allocate an IP address to each equipment in an Ethernet.

As in the first embodiment, each computer 100 is provided with a management interface 109, each storage 110 is provided with a management interface 119, and the FC switch 150 is provided with a management interface 159. In addition, each computer 200 is provided with a management interface 209, each storage 210 is provided with a management interface 219, and an IP switch 250 is provided with a management interface 259. Each of the management interfaces is connected to a management unit 300. Since the FC switch 150 has the IP emulator 500, the FC switch 150 is detected by the management unit 300 as if it is an IP switch.

This is due to the fact that the IP emulator 500 of the FC switch 150 is designed to reply "IP switch" as the classification in response to a search for IP switches by the management unit 300. In the present specification, the FC switch 150 having the IP emulator 500 is called a "virtual-IP switch" when necessary in order to distinguish it from true IP switches.

The management unit 300 has the same configuration as the management unit 300 in the first embodiment as shown in FIG. 2, but the management unit 300 in the present embodiment performs the topology management of a network by executing topology management software (omitted from drawings) designed for IP addresses.

Upon receiving an IP address allocation request from the equipments connected, the DHCP server 600 allocates a 4-byte value called an IP address to each equipment and sends the allocated IP address to each equipment. Due to the fact that each IP address allocation request stores its corresponding MAC address along with an identifier that represents the IP address allocation request, the DHCP server 600 creates and stores a conversion table of the MAC addresses received and the IP addresses allocated. Each of the computers 200 and the storages 210 that is connected to the IP switch 250 issues the IP address allocation request to the DHCP server 600 at initialization. Each of the computers 200 and the storages 210 receives an IP address, and the computers 200 and the storages 210 communicate with each other based on their IP addresses. Equipments that are connected to the FC switch 150 do not require IP addresses, since they are identified by WWNs. However, by allocating virtual-IP addresses even to equipments connected to the FC switch 150, a consolidated management based on the IP addresses becomes possible. Consequently, in the present invention, a consolidated management based on the IP addresses is realized by the management unit 300 by using the IP emulator 500 that allocates virtual-IP addresses to equipments that are connected to the FC switch and that are identified by WWNs.

The FC switch 150 in the system configuration shown in FIG. 12 has four FC ports 151-154. Each of the computers 100 and each of the storages 110 is connected to one of the FC ports 151-154, and each of the computers 100 and each of the storages 110 has one of the FC ports 101-104. The FC switch 150 collects current connection information and creates connection information 155 as shown in FIG. 3. The IP emulator 500 provided in the FC switch 150 recognizes that four equipments are connected to the FC switch 150 based on the connection information 155. A control section 520 of the IP emulator 500 creates four IP address allocation requests using four MAC addresses (which are MAC addresses 501-504 in this example, but in reality a MAC address is a 6-byte value unique to each equipment) of the MAC addresses that have been allocated in advance to the IP emulator 500, and issues the four IP address allocation requests to the DHCP server 600 via the management interface 159.

FIG. 14 indicates the content of a conversion table 556 created by the IP emulator 500. In response to the four IP address allocation requests, the DHCP server 600 replies with four IP addresses (which are 601-604 in this example) for the various equipments. The control section 520 of the IP emulator 500 creates the conversion table 556 by using the four virtual MAC addresses and the four IP addresses received and stores the conversion table 556 in a conversion section 510.

Next, the control section 520 of the IP emulator 500 writes the virtual MAC address and the IP address received that are allocated to each equipment in a preservation section 108 provided in each of the computers 100 or a preservation section 118 provided in each of the storages 110. Each of the computers 100 has a receiving section 107 to write in the preservation section 108, and each of the storages 110 has a receiving section 117 to write in the preservation section 118. In the preservation section 108 of the computer A, the virtual MAC address 501 and the IP address 601 are written. In the preservation section 108 of the computer B, the virtual MAC address 502 and the IP address 602 are written. In the preservation section 118 of the storage A, the virtual MAC address 503 and the IP address 603 are written. In the preservation section 118 of the storage B, the virtual MAC address 504 and the IP address 604 are written.

In the configuration shown in FIG. 12, the management unit 300 recognizes a storage network that is connected by the FC switch 150 and the IP switch 250 as a storage network consisting of two IP switches. This is due to the fact that the FC switch 150 is connected to the management unit 300 via the IP emulator 500 and the management interface 159.

A control section 330 of the management unit 300 searches, via a management interface connection device 310, for IP switches that are connected. Each of the equipments that is connected to the management unit 300 responds with its equipment name and classification to an inquiry from the management unit 300. In the case of a computer, its classification is "information processing unit"; in the case of a storage, its classification is "storage unit"; and in the case of an IP switch, its classification is "IP switch." The inquiry from the management unit 300 to the FC switch 150 is intercepted by the control section 520 of the IP emulator 500, which replies "IP switch" as the classification.

Figure 15:
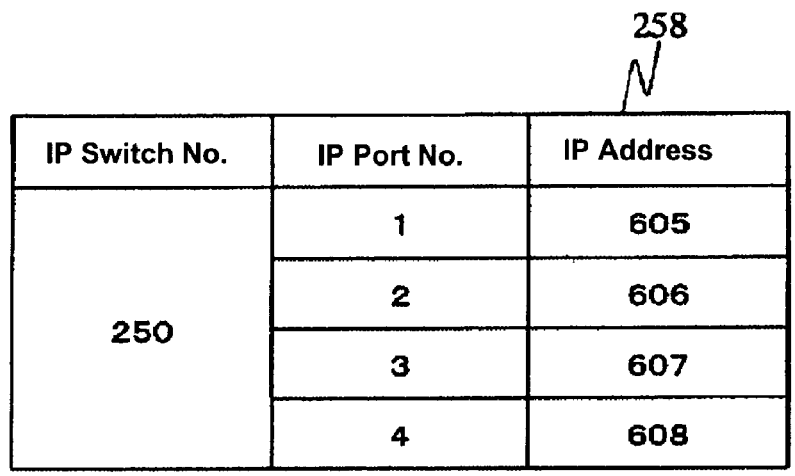
FIG. 15 shows a table indicating connection information of an IP switch 250 in accordance with the second embodiment.

FIG. 15 indicates connection information 258 of the IP switch 250. The control section 330 of the management unit 300 issues to the IP switch 250 via the management interface connection device 310 a request to obtain connection information. Upon receiving the request to obtain connection information from the management unit 300, the IP switch 250 sends the connection information 258. The connection information of the IP switch 250 is expressed using IP addresses. The IP addresses indicated in FIG. 15 are IP addresses allocated to various equipments by the DHCP server 600. From the connection information 258, we can see that equipments with IP addresses 605-608 are connected to the IP ports 1-4, respectively, of the IP switch 250. The control section 330 of the management unit 300 issues to the virtual-IP switch (the FC switch 150) via the management interface connection device 310 a request to obtain connection information.

Figure 16:
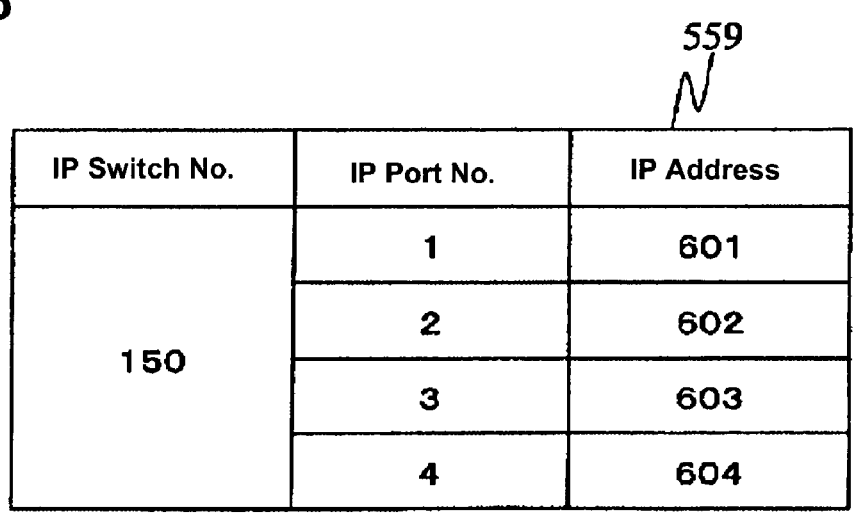
FIG. 16 shows a table indicating connection information of a virtual-IP switch in accordance with the second embodiment.

FIG. 16 indicates connection information 559 of the virtual-IP switch. The IP emulator 500 intercepts the request to obtain connection information issued to the FC switch 150 from the control section 330 of the management unit 300. The control section 520 of the IP emulator 500, upon receiving the request to obtain connection information from the management unit 300, creates the connection information 559 using the conversion table 556 stored in the conversion section 510, and sends the connection information 559 created to the management unit 300. The connection information for the FC switch 150 that was sent is connection information that allows the management unit 300 to identify equipments on the network. We can see from the connection information 559 that the equipments with IP addresses 601-604 are connected to the IP ports 1-4 of the virtual-IP switch (the FC switch 150), respectively.

As stated earlier, the control section 330 of the management unit 300 obtains the connection information 258 from the IP switch 250 and the connection information 559 from the FC switch 150 via the IP emulator 500.

However, although the connection information reveals the IP addresses of the equipments connected in each case, it does not reveal the names or classifications of the equipments connected. For this reason, the control section 330 of the management unit 300 makes an inquiry via the management interface connection device 310 to each of the computers 100 and 200, as well as to each of the storages 110 and 210, in an attempt to obtain the name, classification and IP address of each equipment. Upon receiving from the management unit 300 the request to obtain equipment identification information, each of the computers 200 and each of the storages 210 sends to the management unit 300 the name, classification and the IP address it obtained from the DHCP server 600 at initialization.

FIG. 17 indicates the equipment identification information for the computers 200 and the storages 210. Each of the computers 200 sends equipment identification information 223 or 224 to the management unit 300, and each of the storages 210 sends equipment identification information 227 or 228 to the management unit 300. Upon receiving the request to obtain equipment identification information from the management unit 300, each of the computers 100 and each of the storages 110 sends to the management unit 300 its name, classification and the IP address as the equipment identification information. The IP addresses are stored in the preservation sections 108 and 118. Each of the computers 100 sends equipment identification information 221 or 222 to the management unit 300, and each of the storages 110 sends equipment identification information 225 or 226 to the management unit 300.

Figure 18:
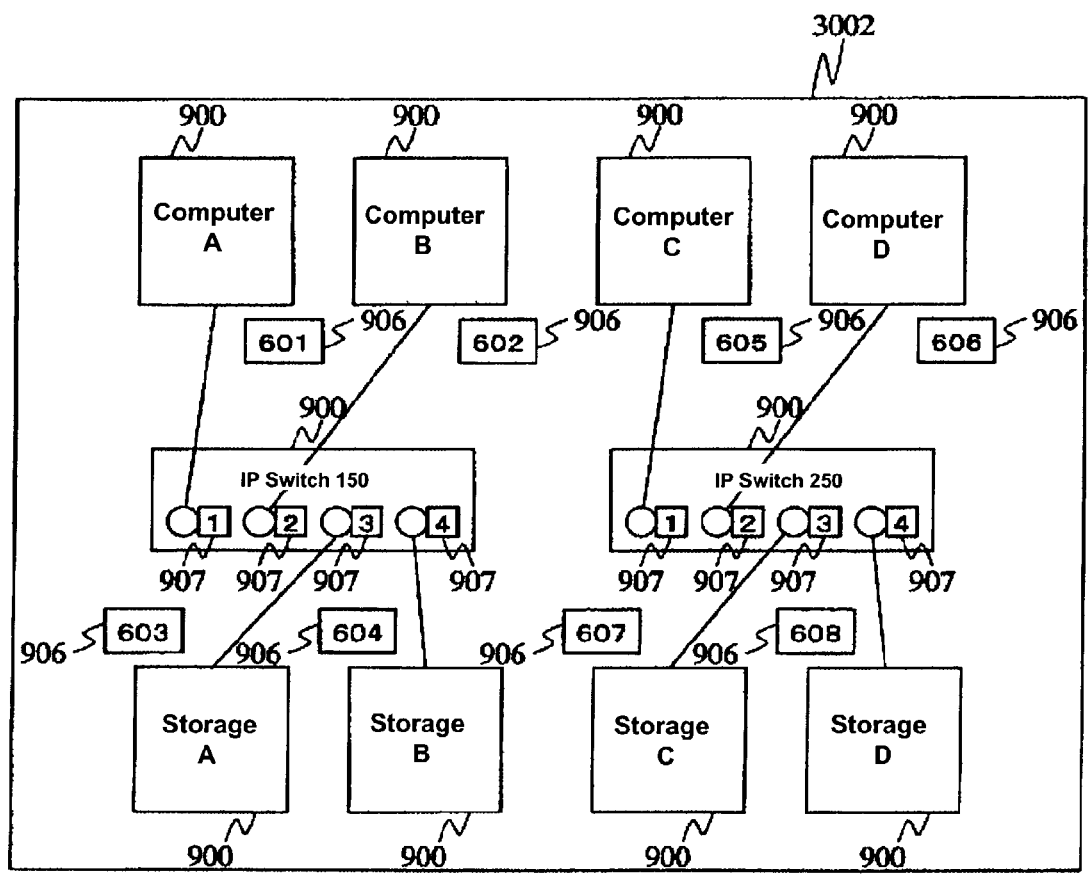
FIG. 18 shows a diagram indicating display data of a management unit in accordance with the second embodiment.
Figure 19:
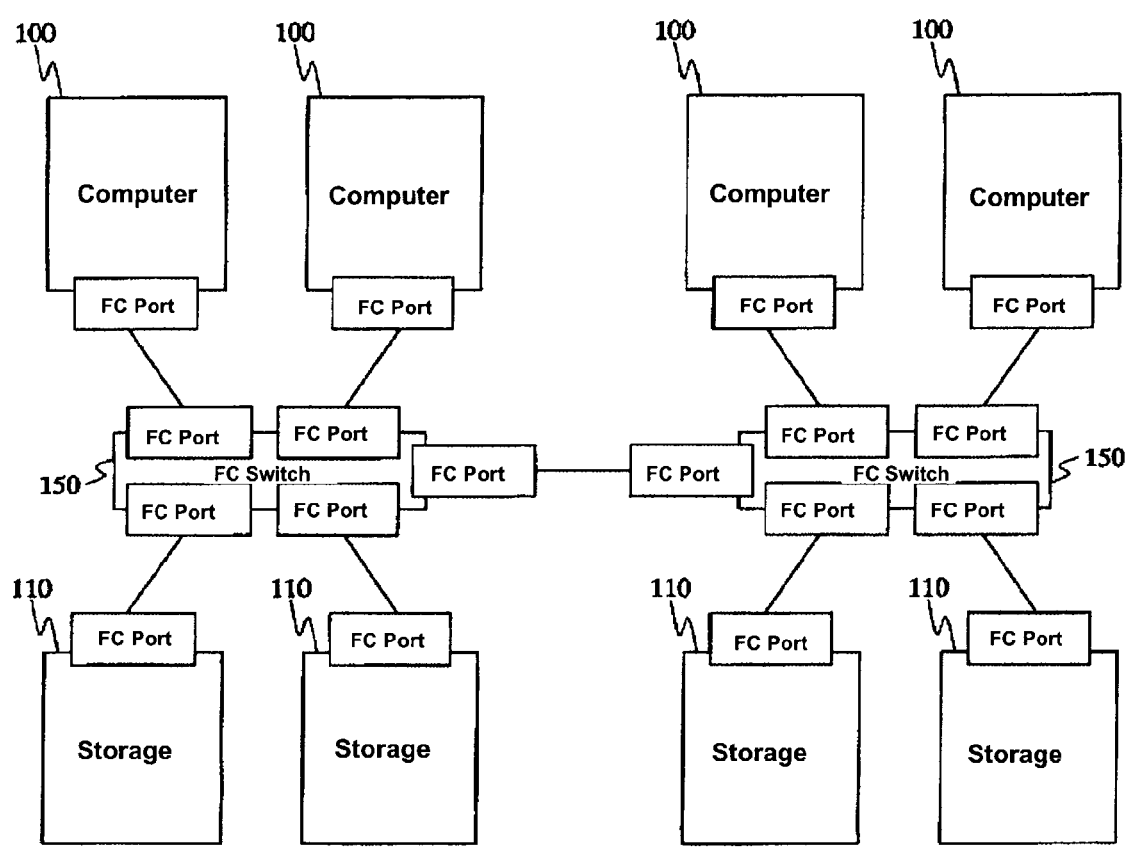
FIG. 19 shows a diagram of an example of an information processing system based on a storage network using a fibre channel.
Figure 20:
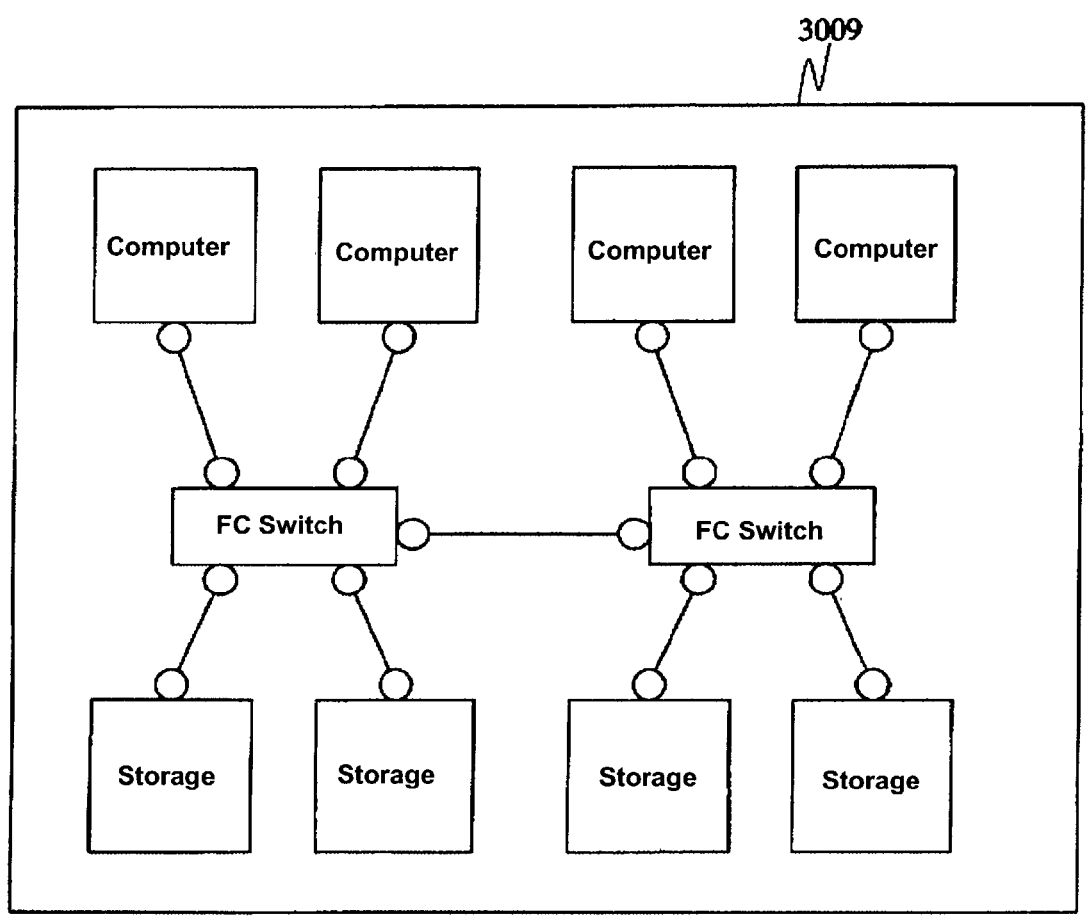
FIG. 20 shows a diagram of an example of display data in topology management software.

FIG. 18 indicates display data that is provided as an output to a display of the management unit 300. The control section 330 of the management unit 300 creates a topology map based on the connection information 258 and 559 and on the equipment identification information 221-228 and displays the topology map on a display 390. The topology map is display data 3002, which includes rectangular representations that indicate the positions of the computers A-D, the storages A-D and the IP switches 150 and 250 in the actual network, as well as representations that indicate the IP addresses of the computers A-D, the storages A-D and the IP switches 150 and 250. In the display data 3002 shown in FIG. 18, each rectangular region 900 can be replaced by an icon representing that equipment. An IP address display region 906 is provided near each rectangular region 900 to display the IP address of the corresponding equipment. Small circles represent IP ports of the IP switches, and an IP port number display region 907 is provided near each small circle to display the appropriate IP port number.

Next, we will explain VLAN setting. VLAN is a setup that allows communication between only certain IP ports in an IP switch.

In a system configuration shown in FIG. 12, in order to obtain a setting whereby the storage C is available for use only by the computer C and the storage D is available for use only by the computer D, the control section 330 of the management unit 300 issues a VLAN setting request 293 such as shown in FIG. 11 to the IP switch 250 via the management interface connection device 310. Upon receiving the VLAN setting request 293, the IP switch 250 permits communication only between IP ports 1 and 3 in VLAN 1 and communication only between IP ports 2 and 4 in VLAN 2. As a result of this, the computer D cannot use the storage C, and the computer C cannot use the storage D.

In order to similarly obtain a setting whereby the storage A is available for use only by the computer A and the storage B is available for use only by the computer B, the control section 330 of the management unit 300 issues the VLAN setting request 293 such as shown in FIG. 11 to the virtual-IP switch via the management interface connection device 310. The VLAN setting request 293 issued to the virtual-IP switch is intercepted by the control section 520 of the IP emulator 500, which uses the conversion table 556 in the conversion section 510 to create a zoning setting request 291 shown in FIG. 9 and issues the zoning setting request 291 to the FC switch 150. Upon receiving the zoning setting request 291, the FC switch 150 permits communication only among WWNs 101, 103, 151 and 153 in zone A, and only among WWNs 102, 104, 152 and 154 in zone B.

As a result of this, the computer B cannot use the storage A, and the computer A cannot use the storage B. As stated earlier, although the zoning and VLAN of the FC switch 150 and the IP switch 250, respectively, establish different setups based on different setting requests, i.e., the zoning setting request and the VLAN setting request, they both realize communication only between certain computers and certain storages.

Since the VLAN setting request from the management unit 300 to the virtual-IP switch is converted into a zoning setting request by the IP emulator 500 before it is issued to the FC switch 150, the administrator who uses the management unit 300 can perform the zoning setting for the FC switch using the same method that he or she uses to perform the VLAN setting for the IP switch and without having to be aware that it is in fact an FC switch.

As a result, by providing the IP emulator 500, the management unit 300 can consolidate its management of the system including the FC switch 150 through the use of IP addresses. There is no need to add to the management unit 300 any topology management software designed for WWNs, and topology management software designed only for conventional IP addresses can be used.

In the present embodiment, the IP emulator 500 was described as being provided within the FC switch 150, but the IP emulator 500 may be provided as a unit independent of the FC switch 150. Alternatively, the functions of the IP emulator 500 can be provided within the management unit 300.

Further in the present embodiment, the preservation section 108 and the receiving section 107 are provided in each of the computers 100, and the preservation section 118 and the receiving section 117 are provided in each of the storages 110, and as a result when the request to obtain equipment identification information is received from the management unit 300 the respective units reply with their respective IP addresses that had been received from the IP emulator 500 in advance. However, each of the computers 100 and each of the storages 110 may be provided with an inquiry section that inquires the equipment's equipment identification numbers. In this case, once the request to obtain equipment identification information is received from the management unit 300, the inquiry section of each of the computers 100 and each of the storages 110 inquires the conversion section 510 of the IP emulator 500 and thereby obtains and replies with the respective IP address whenever a request is made.

As described above, the present invention can provide a topology management system that does not require any development of new topology management consoles (or of topology management software designed for MAC addresses), even when a storage network with new equipment identification numbers is connected.

Furthermore, the present invention can provide a topology management system that allows a consolidated topology management using equipment identification numbers that topology administrators are familiar with. Particularly in storage networks connected by Ethernet, the present invention can provide a topology management system that allows topology management consoles to have a consolidated topology management with WWNs and without having to work with MAC addresses or IP addresses.

Moreover, the present invention can provide, in storage networks in which two or more networks having different information equipment identification number systems such as fibre channel and Ethernet coexist, a system that allows topology management consoles to operate and manage, in a consolidated manner and by using WWN, equipments that make up the network.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A network topology management system comprising:
   a first network system including one or more first computers, one or more first storage system and one or more first connection units that control connection switching between the first computers and the first storage systems;
   a second network system including one or more second computers, one or more second storage systems and one or more second connection units that control connection switching between the second computers and the second storage systems;
   an emulator that is coupled to the second network system; and
   a management unit that is coupled to the first network system and the emulator via a management network;
   wherein the emulator comprises a conversion section that converts a first equipment identification information that identifies the second computer or the second storage system in the second network system into a MAC address that is recognizable by the management unit to identify the second computer or the second storage system,
   wherein the management unit manages a network topology, configuring both a first network topology corresponding to the first network system and a second network topology corresponding to the second network system, the network topology consisting of the computers, the storage systems and the connection units,
   wherein the emulator also comprises a transmitting section that sends a second equipment identification information to the management unit, and
   wherein at least one of the first computers and the first storage systems has a transmitting section that sends a MAC address of each of the corresponding first computers and the first storage systems in the first network to the management unit,
   wherein the management unit comprises a network interface unit that receives the MAC address from the emulator and the MAC address from the first network, for identifying the first computer or the first storage system, wherein the MAC address from the first network is recognizable by the management unit equivalently to the MAC address from the emulator as a same format, and
   the management unit has a control section that outputs to a providing section a topology map that correlates, based on the MAC addresses, positions in the network of the computers, the storage systems and the connection units to the MAC addresses of the computers, the storage systems and the connection units, wherein the network topology uses both the MAC addresses and the first equipment identification information.

2. A network topology management system comprising:
   a first network system including a first computer, a first storage system and a first connection unit that control connection switching between the first computer and the first storage system;
   a second network system including a second computer, a second storage system and a second connection unit that control connection switching between the second computer and the second storage system; and
   a management unit that manages a network topology, by configuring both a first network topology corresponding to the first network system and a second network topology corresponding to the second network system, the network topology consisting of the computers, the storage systems and the connection units,
   wherein at least one of the computers and the storage systems comprises a transmitting section that sends an equipment identification number of each of the corresponding computers and the storage systems to the management unit, the management unit having a network interface section that receives the equipment identification numbers and a second equipment identification information, and
   a control section that outputs to a providing section a topology map that correlates, based on the equipment identification numbers, positions in the network of computers, the storage systems and the connection units to the equipment identification numbers computers, the storage systems and the connection units, wherein the connection units and the management unit are connected to one another via an exclusive line, wherein the network topology uses both a first equipment identification information and a second equipment identification information, and wherein the management unit manages the network topology based on the second equipment identification information.

3. A network topology management system comprising:

a first network system including a first computer, a first storage system and a first connection unit that control connection switching between the first computer and the first storage system;

a second network system including a second computer, a second storage system and a second connection unit that control connection switching between the second computer and the second storage system; and a management unit that manages a network topology, by configuring both a first network topology corresponding to the first network system and a second network topology corresponding to the second network system, the network topology consisting of the computers, the storage systems and the connection units, wherein at least one of the computers and the storage systems comprises a transmitting section that sends IP addresses, obtained from a DHCP server, to the management unit, which has network interface section that receives the IP addresses and a second equipment identification information, and the management unit comprises a control section that outputs to a providing section a topology map that correlates, based on the IP addresses, the positions in the network of the computers, storage systems and the connection units to the IP addresses of the computers, storage systems and the connection units, wherein the network topology uses both the IP addresses for equipment identification information and a second equipment identification information and, wherein the management unit manages the network topology based on the IP addresses.

4. A network topology management system comprising:

a first network system including a first computer, a first storage system and a first connection unit that control connection switching between the first computer and the first storage system;

a second network system including a second computer, a second storage system and a second connection unit that control connection switching between the second computer and the second storage system; and a management unit that manages a network topology, by configuring both a first network topology corresponding to the first network system and a second network topology corresponding to the second network system, the network topology consisting of the computers, the storage systems and the connection units, wherein at least one of the computers and the storage systems comprises a transmitting section that sends IP addresses, obtained from a DHCP server, to the management unit, which comprises network interface section that receives the IP addresses and a second equipment identification information, the management unit also comprises a control section that issues VLAN setting requests to the connection units, and the connection units control connection switching between the computers and the storage systems based on the VLAN selling requests, wherein the network topology uses both the IP addresses for equipment identification information and a second equipment identification information and, wherein the management unit manages the network topology based on the IP addresses.

* * * * *